(12) United States Patent
Hanks et al.

(10) Patent No.: US 7,646,685 B2
(45) Date of Patent: Jan. 12, 2010

(54) TRACING DISCRETE SPIRAL PATH RELATIVE TO OPTICAL DISC

(75) Inventors: D. Mitchel Hanks, Fort Collins, CO (US); Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 11/150,691

(22) Filed: Jun. 11, 2005

(65) Prior Publication Data

US 2006/0280078 A1    Dec. 14, 2006

(51) Int. Cl.
    *G11B 7/0045* (2006.01)
(52) U.S. Cl. .............. 369/47.41; 369/53.29; 369/44.39
(58) Field of Classification Search .............. 369/53.29, 369/116, 47.39, 47.41, 44.39
    See application file for complete search history.

(56) References Cited

U.S. PATENT DOCUMENTS

| | | | |
|---|---|---|---|
| 4,037,252 A | 7/1977 | Janssen | |
| 5,619,387 A | 4/1997 | Ottesen et al. | |
| 5,751,671 A * | 5/1998 | Koike et al. | 369/14 |
| 6,215,758 B1 * | 4/2001 | Horimai et al. | 369/275.3 |
| 6,603,714 B1 * | 8/2003 | Winter | 369/30.27 |
| 7,129,968 B2 * | 10/2006 | Morishima | 347/253 |
| 7,187,637 B2 * | 3/2007 | Pate et al. | 369/53.21 |
| 2002/0191517 A1 * | 12/2002 | Honda et al. | 369/53.29 |
| 2003/0133005 A1 * | 7/2003 | Bronson | 347/247 |
| 2004/0001411 A1 * | 1/2004 | Morishima | 369/53.28 |
| 2004/0136291 A1 * | 7/2004 | Hayashi | 369/53.2 |
| 2005/0058044 A1 | 3/2005 | Koegler | |

FOREIGN PATENT DOCUMENTS

| | | |
|---|---|---|
| EP | 1308938 | 5/2003 |
| EP | 1429319 | 6/2004 |
| EP | 1515 318 | 3/2005 |

* cited by examiner

Primary Examiner—Wayne R Young
Assistant Examiner—Thomas D Alunkal

(57) ABSTRACT

As an optical disc is being rotated within an optical drive, an optical mechanism of the optical drive traces a discrete spiral path relative to the optical disc. As the discrete spiral path is traced by the optical mechanism of the optical drive, the optical mechanism selectively writes to the optical disc.

27 Claims, 11 Drawing Sheets

TRACING DISCRETE SPIRAL PATH RELATIVE TO OPTICAL DISC

BACKGROUND

Many types of optical discs include a data region and a label region. The data region is where the machine-readable binary data is written to, whereas the label region allows the user to record a human-readable label or image on the optical disc. A laser or another type of optical beam can be used to read from and/or write to the data region and the label region of an optical disc. For example, in the patent application entitled "Integrated CD/DVD Recording and Label", filed on Oct. 11, 2001, and assigned Ser. No. 09/976,877, a type of optical disc is disclosed in which a laser or other optical beam can be used to write to the label region of an optical disc.

In some optical discs, the data region and the label region may be on opposite sides of the disc. The data side of such an optical disc typically has one spiral track or a number of concentric tracks preconstructed thereon in the form of grooves. Therefore, an optical drive is able to employ a feedback-type process, such as a closed loop-type process, to ensure that it is properly following a track when writing data to or reading data from the track. However, the label side of an optical disc, such as the label side of the optical disc described in the patent application assigned Ser. No. 09/976,877, usually does not have any preformed tracks. As a result, it can be difficult to properly follow a track when writing to the label side of such an optical disc.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Representative Optical Drive

Figure 1:
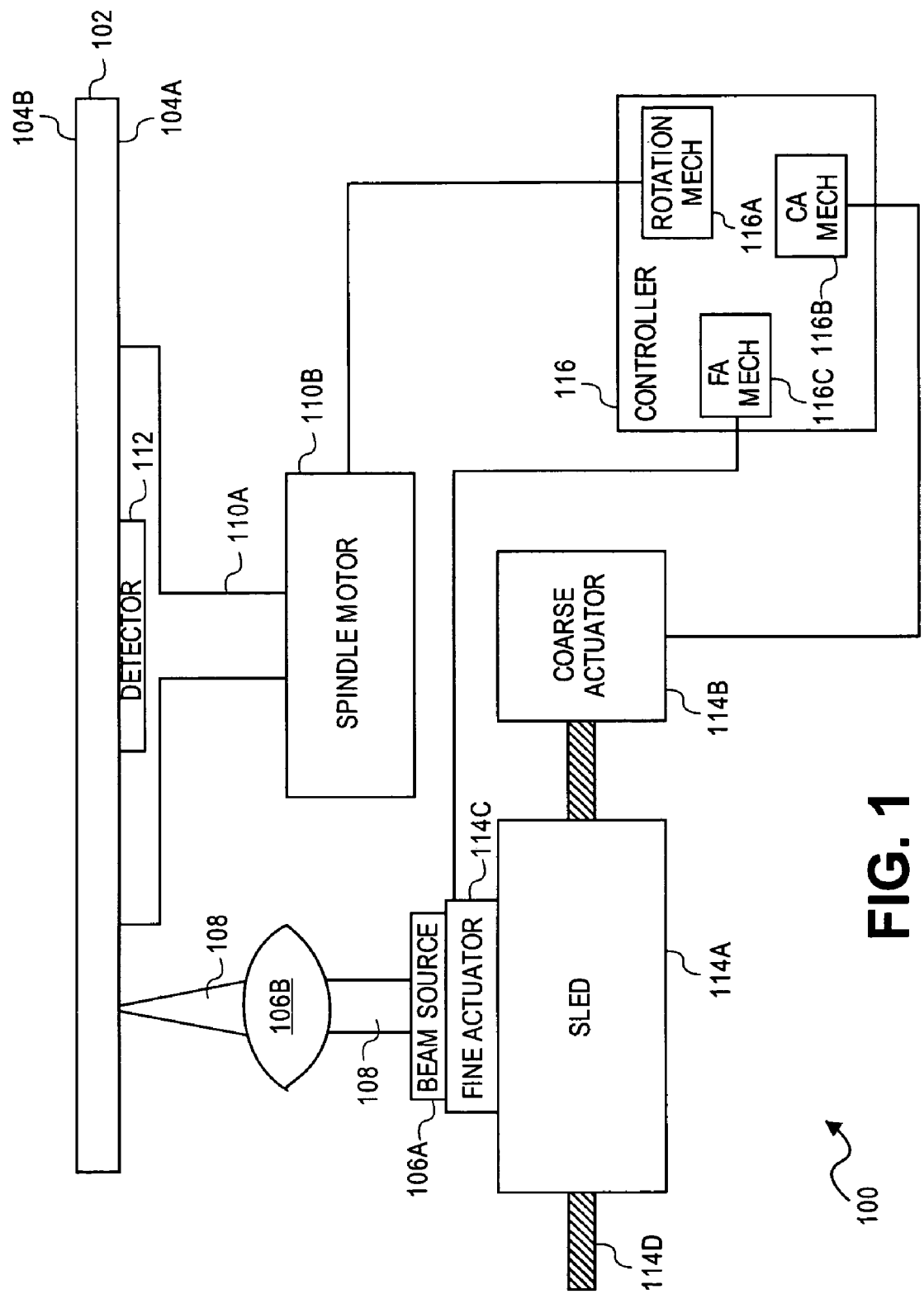
FIG. 1 is a diagram of an optical drive, according to an embodiment of the invention.

FIG. 1 shows a representative optical drive 100, according to an embodiment of the invention. The optical drive 100 is for reading from and/or writing to an optical disc 102. More specifically, the optical drive 100 is for reading from and/or writing to an optically writable label side 104A of the optical disc 102, and/or an optically writable data side 104B of the optical disc 102, which are collectively referred to as the sides 104 of the optical disc 102. As depicted in FIG. 1, the optical drive 100 is ready for reading from and/or writing to the label side 104A of the optical disc 102. For the optical drive 100 to read from and/or write to the data side 104B of the optical disc 102, the optical disc 102 would have to be turned over, so that the data side 104B is oriented downwards and the label side 104A is oriented upwards.

The optical drive 100 is depicted in FIG. 1 as including a beam source 106A and an objective lens 106B, which are collectively referred to as the optical mechanism 106. The beam source 106A generates an optical beam 108 that is focused by the objective lens 106B onto the optical disc 102. The optical beam source 106A may be a laser beam source, such that the optical beam 108 is a laser beam. The optical mechanism 106 may include other components besides those depicted in FIG. 1. For example, the optical mechanism 106 may include one or more mirrors, as well as a photodetector, so that reflections of the beam 108 off the optical disc 102 can be directed to the photodetector by the mirrors and detected by the photodetector. As another example, the optical mechanism 106 may include polarizing beam splitters, quarter-wave plates, voice coils, and so on.

The optical drive 100 is also depicted in FIG. 1 as including a spindle 110A and a spindle motor 110B, which are collectively referred to as the first motor mechanism 110. The spindle motor 110B rotates the spindle 110A, such that the optical disc 102 correspondingly rotates. The first motor mechanism 110 may include other components besides those depicted in FIG. 1. For instance, the first motor mechanism 110 may include a rotary encoder or another type of encoder to provide for control of the spindle motor 110B and the spindle 110A.

The optical drive 100 also includes a detector 112 situated near or at the spindle 110A. The detector 112 is for detecting alignment marks preformed on the inside circumference of the label side 104A of the optical disc 102, as is described in more detail later in the detailed description. Such alignment marks may be visible from both the data side 104B and the label side 104A of the optical disc 102, where the substrate of the optical disc 102 is at least substantially transparent. The detector 112 may include an optical light source and an optical detector, in one embodiment of the invention. Alternatively, the detector 112 may include other components.

The optical drive 100 is also depicted in FIG. 1 as including a sled 114A, a coarse actuator 114B, a fine actuator 114C, and a rail 114D, which are collectively referred to as the second motor mechanism 114. The coarse actuator 114B is or includes a motor that causes the sled 114A, and hence the fine actuator 114C and the optical mechanism 106 situated on the sled 114A, to move radially relative to the optical disc 102 on the rail 114D. The coarse actuator 114B thus provides for coarse or relatively larger movements of the fine actuator 114C and the optical mechanism 106.

By comparison, the fine actuator 114C also is or includes a motor, and causes the optical mechanism 106 to move radially relative to the optical disc 102 on the sled 114A. The fine actuator 114C thus provides for fine or relatively smaller movements of the optical mechanism 106. The second motor mechanism 114 may include other components besides those depicted in FIG. 1. For instance, the second motor mechanism 114 may include a linear encoder or another type of encoder to provide for control of the coarse actuator 114B and the sled 114A.

The optical drive 100 is finally depicted in FIG. 1 as including a controller 116. The controller 116 is made up of at least a rotation mechanism 116A, a coarse actuator mechanism 116B, and a fine actuator mechanism 116C. The mechanisms 116 may each be implemented in software, hardware, or a combination of software and hardware. The rotation mechanism 116A controls movement of the spindle motor 110B, and thus controls rotation of the optical disc 102 on the spindle 110A, such as the angular velocity of the rotation of the optical disc 102. The coarse actuator mechanism 116B controls the coarse actuator 114B, and thus movement of the sled 114A on the rail 114D. The fine actuator mechanism 116C controls the fine actuator 114C, and thus movement of the beam source 106A on the sled 114A. The controller 116 may further include other components besides those depicted in FIG. 1. For instance, the controller 116 can be responsible for turning on and off, and focusing, the optical beam 108, via control of the beam source 106A and the objective lens 106B. Furthermore, as can be appreciated by those of ordinary skill within the art, the components depicted in the optical drive 100 are representative of one embodiment of the invention, and do not limit all embodiments of the invention.

Discrete Spiral Path

Figure 2:
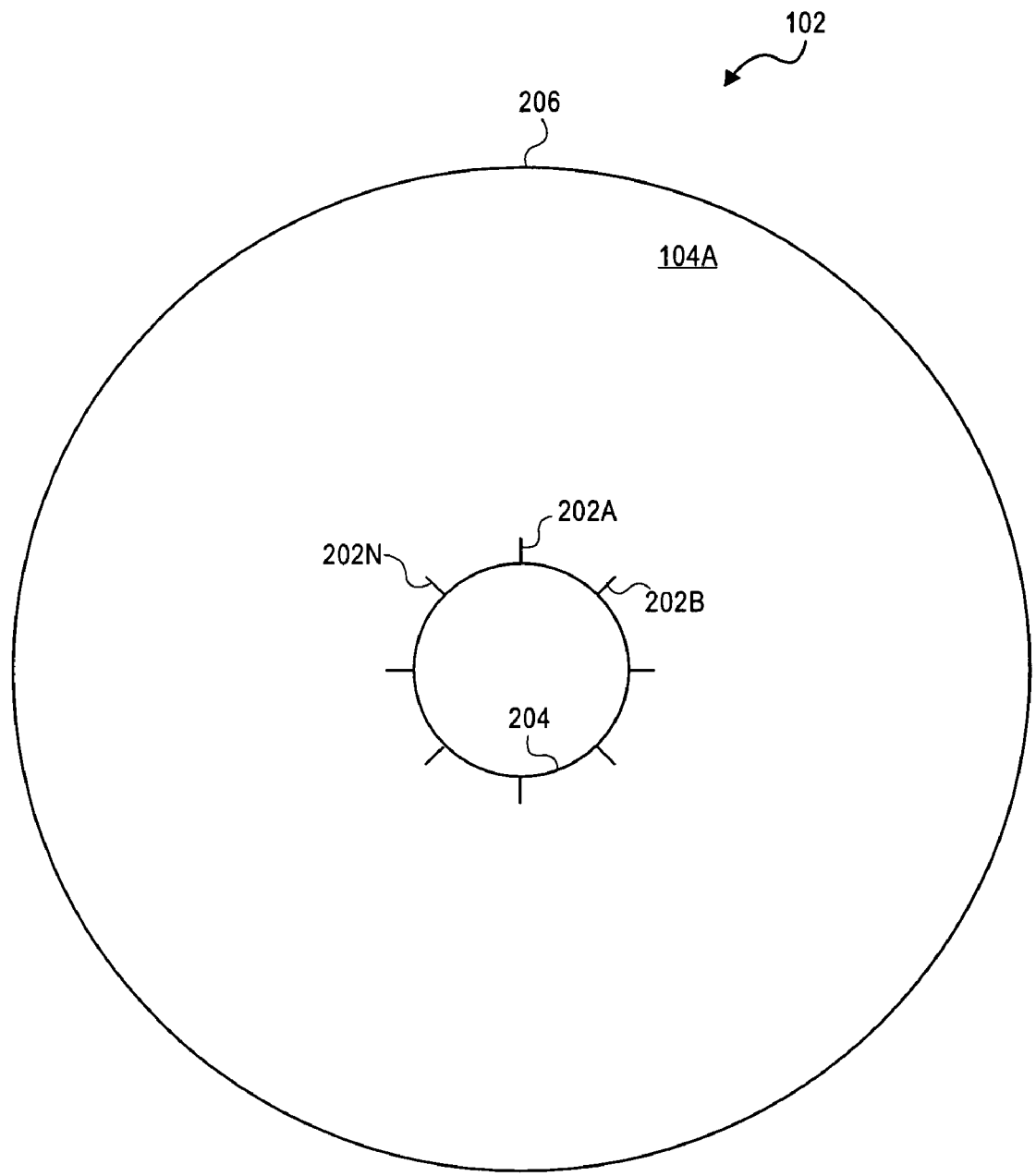
FIG. 2 is a diagram of an optically writable label side an optical disc, on which there are preformed alignment marks, according to an embodiment of the invention.

FIG. 2 shows the optical disc 102 in more detail, according to an embodiment of the invention. Specifically, the label side 104A of the optical disc 102 is depicted. The optical disc 102 has an inside circumference 204 and an outside circumference 206. On the label side 104A, around the inside circumference 204, are a number of alignment marks 202A, 202B, ..., 202N, collectively referred to as the alignment marks 202. The alignment marks 202 are preformed around the inside circumference 204 at equidistant intervals. The alignment marks 202 are preformed in the sense that they are not optically written to the optical disc 102 using the optical drive 100 of FIG. 1. While the alignment marks 202 are depicted in FIG. 2 as being around the inside circumference 204, in another embodiment they may be around the outside circumference 204. Just eight of the alignment marks 202 are shown in FIG. 2 for illustrative clarity. In actuality, there may be many more of the alignment marks 202, such as 400 of the alignment marks 202.

The label side 104A is in one embodiment optically writable. For instance, the label side 104A may be part of an optical disc that is disclosed in the previously filed patent application assigned Ser. No. 09/976,877, which discloses an optically writable label side of an optical disc. As such, a desired image may be optically written on the label side 104A. In order for such an image to be optically written on the label side 104A, the optical mechanism 106 of FIG. 1 traces a path over the surface of the label side 104A, and selectively write marks to pixels of the label side 104A in accordance with this image as the path is traced. Embodiments of the invention achieve in particular a discrete spiral path, as is now described.

Figure 3:
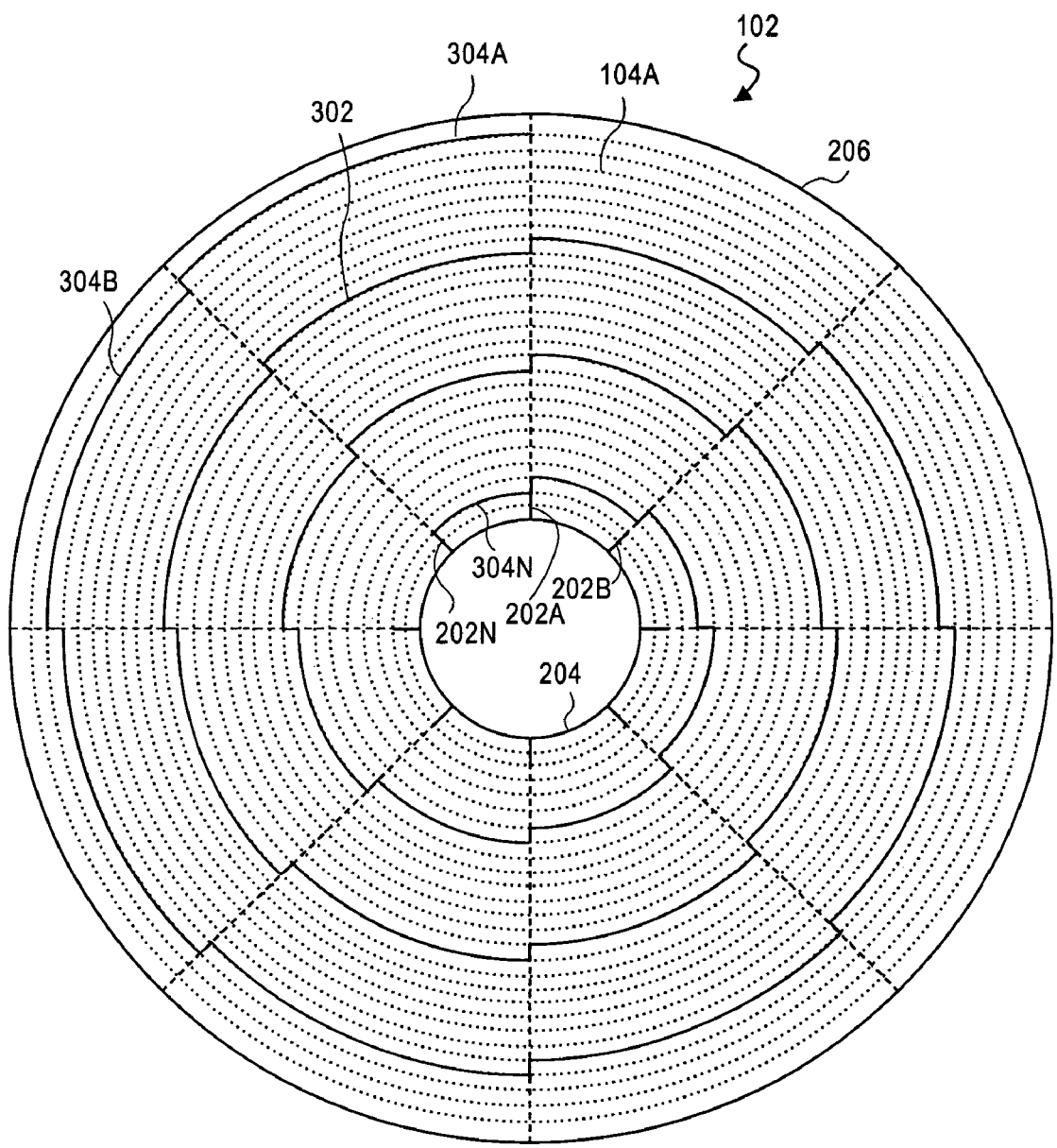
FIG. 3 is a diagram of a discrete spiral path that an optical mechanism of an optical drive can trace relative to an optical disc; according to an embodiment of the invention.

FIG. 3 illustratively shows a discrete spiral path 302 that can be traced via the optical mechanism 106 of FIG. 1 relative to the label side 104A of the optical disc 102, according to an embodiment of the invention. Alternatively, the discrete spiral path 302 may be traced by the optical mechanism 106 of FIG. 1 relative to the data side 104B of the optical disc 102. The discrete spiral path 302 is specifically the path relative to the optical disc 102 that the beam 108 generated by the optical mechanism 106 follows or traces. The discrete spiral path 302 is typically more compressed than as depicted in FIG. 3, such that substantially the entire surface of the label side 104A of the optical disc 102 is covered by the path 302. However, the discrete path 302 is depicted in a more expanded manner in FIG. 3 for illustrative clarity.

The discrete spiral path 302 is followed by the optical mechanism 106 in an open-loop manner. That is, there is no detection performed to confirm that the optical mechanism 106 is following the discrete spiral path 302, such that there is no feedback to the optical drive 100 to verify that the optical mechanism 106 is tracing the discrete spiral path 302. Such a manner by which the discrete spiral path 302 is traced by the optical mechanism 106 is particularly advantageous in relation to the label side 104A of the optical disc 102, because the label side 104A may pot have preformed tracks or grooves (different than the preformed alignment marks 202) that are amenable to following by the optical mechanism 106 in a feedback or a closed-loop manner. Such tracks or grooves may be preformed on the data side and detectable while binary data is being read from or written to the data side.

The discrete spiral path 302 has a number of concentrically circular segments 304A, 304B, ..., 304N, which are collectively referred to as the concentrically circular segments 304. Each of the concentrically circular segments 304 is part of an imaginary circle that is concentric with the imaginary circles of the other concentrically circular segments 304. Stated another way, each position along the concentrically circular segments 304 has the same radius relative to the center or hub of the optical disc 102. The imaginary circles are depicted with dotted lines that connect to the endpoints of each segment 304 in FIG. 3.

The discrete spiral path 302 is a spiral path as is evident from FIG. 3, and as is now described. A spiral path is generally defined as a curve on the surface of the optical disc 102 that winds around a fixed point at the center of the optical disc 102, at an increasing or decreasing radius from the point. In a continuous spiral path, each point along the path is at a unique or different radius compared to all the other points of the path. By comparison, the discrete spiral path 302 is discrete in the sense that the radius of any point of the path is not unique relative to any other point of the path. Each point of the discrete spiral path 302 particularly has the same radius as that of the other points along the same concentrically circular segment. The segments 304 are thus the discrete segments of the discrete spiral path 302. The concentrically circular segments 304 together form the discrete spiral path 302, but individually are circular, and not spiral, in nature. If the segments 304 each included a single point, or pixel, then the spiral path 302 would be a continuous spiral path. However, because the segments 304 each include more than one point, or pixel, the spiral path 302 is a discrete spiral path.

The discrete spiral path 302 traced by the optical mechanism 106 of FIG. 1 can be achieved in a number of different manners, one particular manner of which is described later in the detailed description. In general, however, in one embodiment the optical mechanism 106 can start at the outside circumference 206 of the optical disc 102, and trace the discrete spiral path 302 towards the inside circumference 204. In another embodiment, the optical mechanism 206 can start at the inside circumference 204 of the optical disc 102, and trace the discrete spiral path 302 towards the outside circumference 206.

Figure 4:
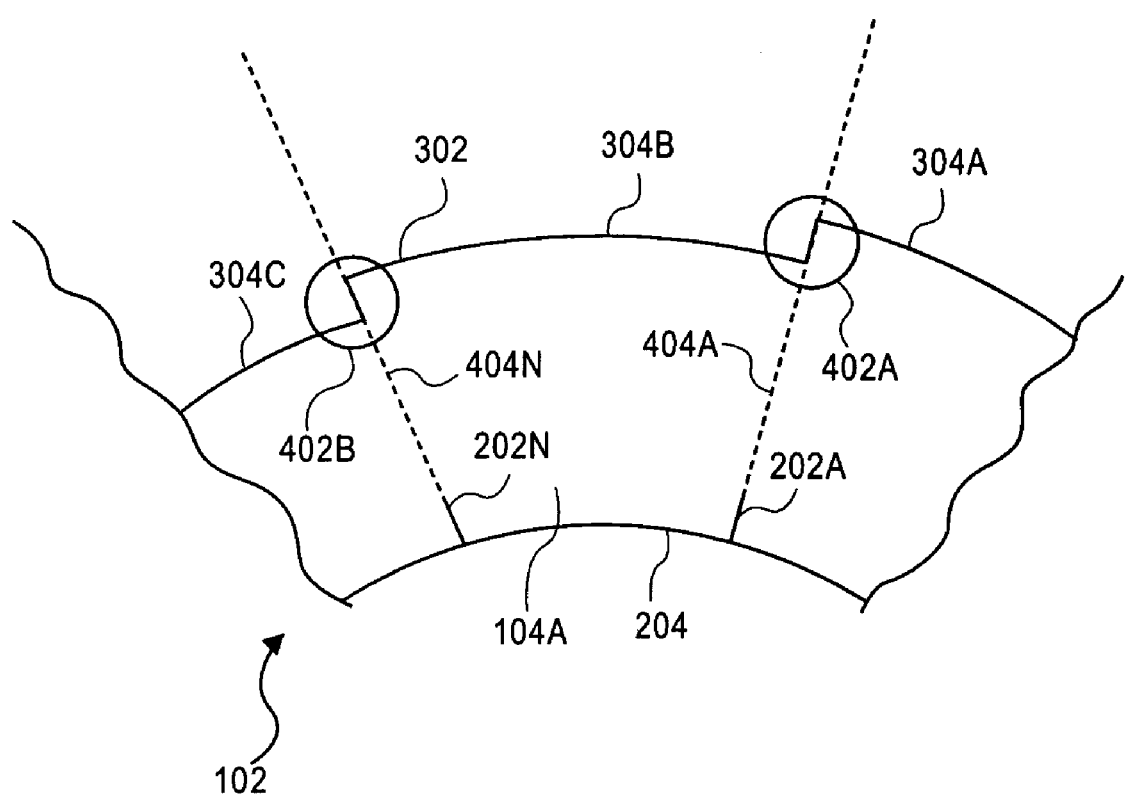
FIG. 4 is a diagram of a portion of the discrete spiral path of FIG. 3 in detail, according to an embodiment of the invention.

FIG. 4 shows in detail a portion of the discrete spiral path 302, to depict how the concentrically circular segments 304 of the discrete spiral path 302 can be particularly traced by the optical mechanism 106, according to an embodiment of the invention. Starting with the optical mechanism 106 properly positioned to form the segment 304A, the optical mechanism 106 of FIG. 1 is not radially moved relative to the optical disc 102, such that it has the same radius relative to the center of the optical disc 102 during the tracing of segment 304A. The segment 304A is achieved, by the movement of the optical mechanism 106 along the segment 304 relative to the optical disc 102 as the optical disc 102 is rotated in a clockwise direction. Once the optical disc 102 has been rotated by a given amount, such as a given angular amount, the discrete spiral path 302 transitions from the segment 304A to the segment 304B, at the circled area 402A. This is accomplished by decreasing the radial position at which the optical mechanism 106 is situated relative to the optical disc 102.

Along the segment 304B, the optical mechanism 106 is again not radially moved relative to the optical disc 102, such that it has the same radius relative to the center of the optical disc 102. The segment 304B is thus also achieved because the optical disc 102 is being rotated. Once the optical disc 102 has been rotated by a given amount, such as a given angular amount, the discrete spiral path 302 transitions from the segment 304B to the segment 304C, at the circled area 402B, again by decreasing the radial position at which the optical mechanism 106 is situated relative to the optical disc 102. This process of moving the optical mechanism 106 to a different radial position relative to the optical disc 102 each time the optical disc 102 has been rotated by a given amount is repeated until the entire discrete spiral path 302 over the optical disc 102 has been traced by the optical mechanism 106.

In one embodiment, it is determined that the optical disc 102 has been rotated the given amount via detection of one of the alignment marks 202. Thus, when the alignment mark 202A is detected, the radial position of the optical mechanism 106 is adjusted so that the discrete spiral path 302 moves from the segment 304A to the segment 304B, as indicated by the circled area 402A. Stated another way, the transition between the segments 304A and 304B occurs at or near a radial line 404A outward from the alignment mark 202A. It is noted that the transition from the segment 304A to the segment 304B is depicted in FIG. 4 as a line segment radially outward from the center of the optical disc 102. However, because the optical disc 102 continues to rotate as the optical mechanism 106 is moved radially inward, in actuality the transition will be an arbitrary curve or an arbitrary line segment. In other embodiments of the invention, other ways to determine that the optical disc 102 has been rotated the given amount may be employed. For instance, optical encoders or Hall sensors may be used.

Next, when the alignment mark 202N is detected, the radial position of the optical mechanism 106 is adjusted so that the discrete spiral path 302 moves from the segment 304B to the segment 304C, as indicated by the circled area 402B. The transition between the segments 304B and 304C thus occurs at or near a radial line 404N outward from the alignment mark 202N. As with the transition from the segment 304A to the segment 304B, the transition from the segment 304B to the segment 304C is depicted in FIG. 4 as a line segment radially outward from the center of the optical disc 102. However, because the optical disc 102 continues to rotate as the optical mechanism 106 is moved radially inward, in actuality the transition will be an arbitrary curve or line segment.

The discrete spiral path 302 is thus traced by the optical mechanism 106 of FIG. 1 staying at a constant radial position relative to the optical disc 102 while the optical disc 102 rotates, until the optical disc 102 has rotated by a given amount. Once the optical disc 102 has rotated by the given amount, the radial position of the optical mechanism 106 is changed. While the optical mechanism 106 stays at a given radial position relative to the optical disc 102, it traces one of the concentrically circular segments 304 of the discrete spiral path 302. When the optical mechanism 106 has its radial position changed, it transitions between two of the concentrically circular segments 304 of the discrete spiral path 302.

The movement of the optical mechanism 106 is generally achieved by using the coarse actuator 114B and the fine actuator 114C of FIG. 1. The fine actuator 114C provides fine movement control of the optical mechanism 106, while the coarse actuator 114B provides coarse movement control of the optical mechanism 106. The fine actuator 114C alone, however, often cannot cause the optical mechanism 106 to radially move relative to the optical disc 102 from one circumference to the other circumference of the disc 102. Furthermore, the coarse actuator 114B alone often cannot move the optical mechanism 106 with the precision needed to achieve the discrete spiral path 302. Therefore, the coarse actuator 114B and the fine actuator 114C are both employed to control movement of the optical mechanism 106, so that it can trace the discrete spiral path 302.

Figure 5A:
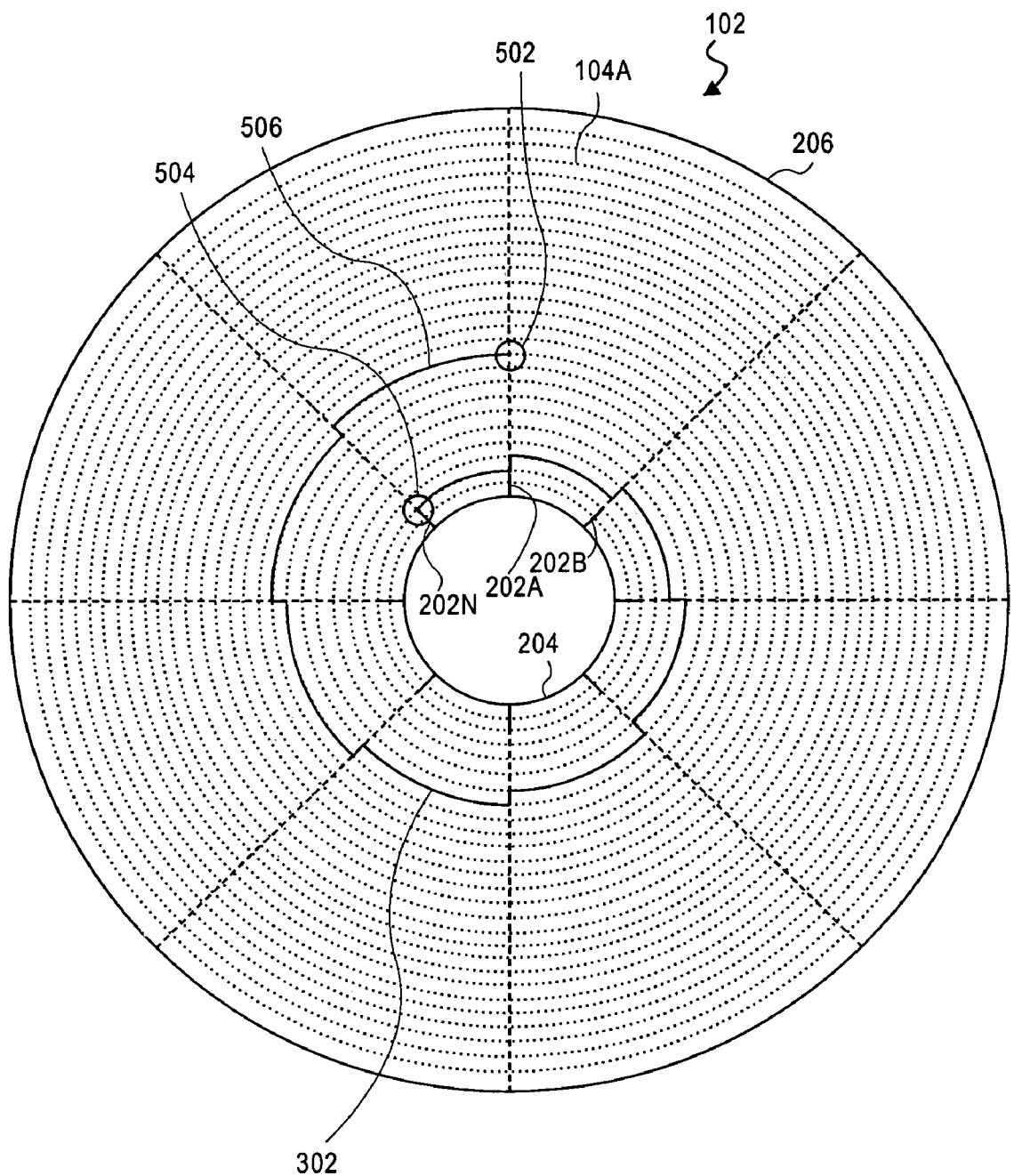
FIGS. 5A, 5B, and 5C are diagrams depicting how the discrete spiral path of FIG. 3 can be traced by an optical mechanism in a portion-by-portion manner, according to an embodiment of the invention.
Figure 5B:
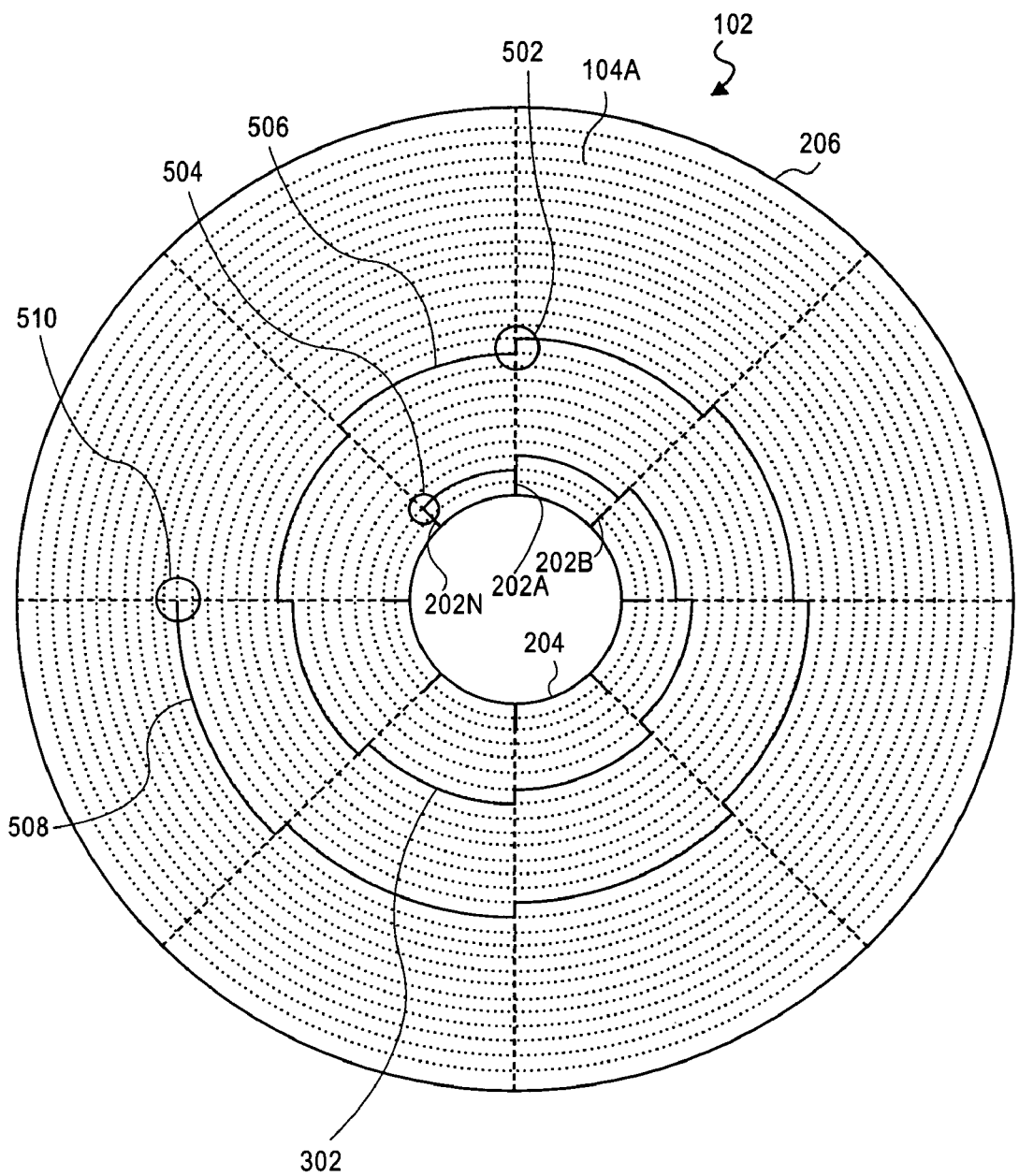
Figure 5C:
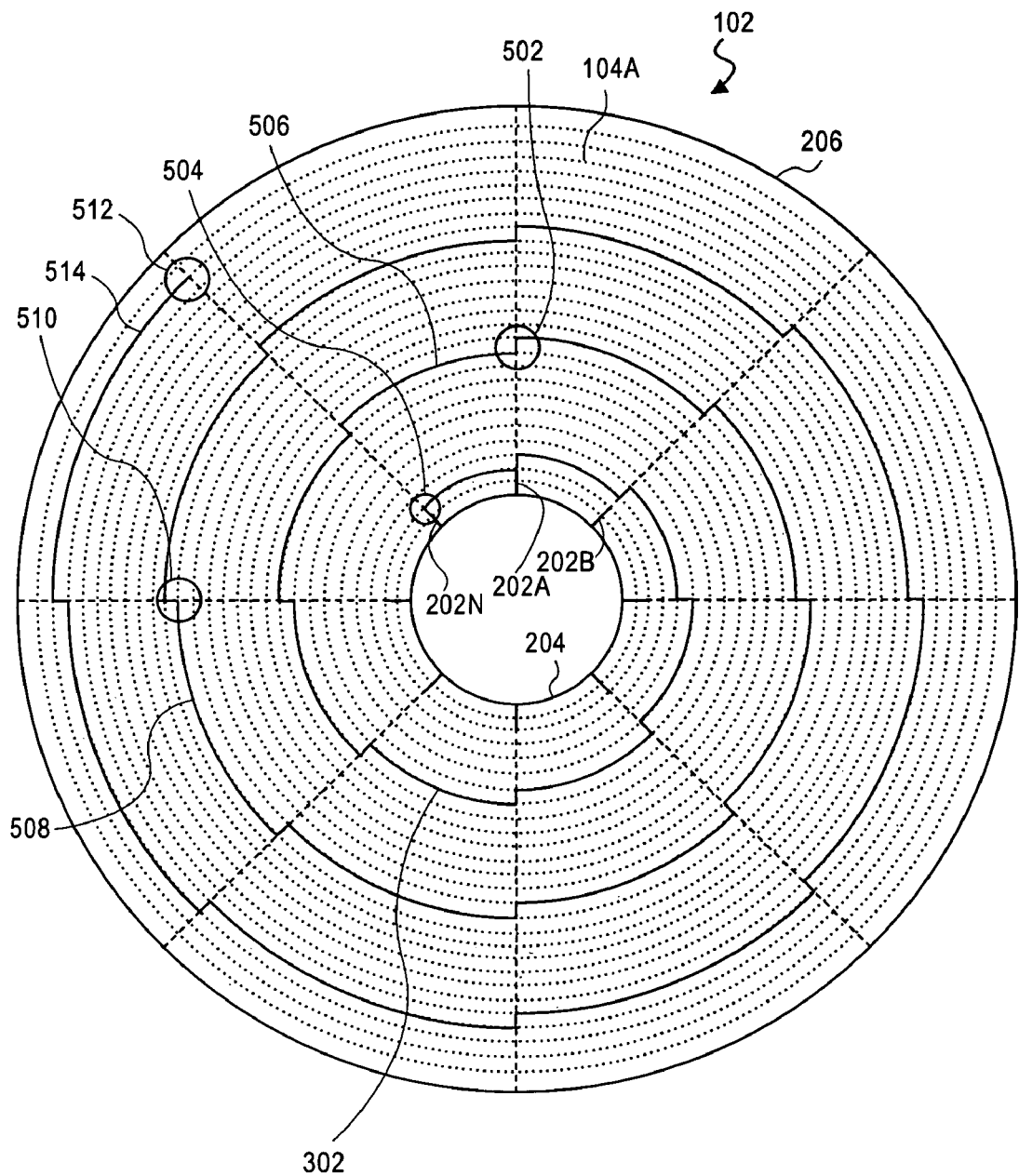

FIGS. 5A, 5B, and 5C illustratively depicted how the coarse actuator 114B and the fine actuator 114C can together be used to cause the optical mechanism 106 to trace the discrete spiral path 302, according to an embodiment of the invention. Referring first to FIG. 5A, the coarse actuator 114B moves the optical mechanism 106 to a radial position such that the optical mechanism 106 begins tracing the discrete spiral path 302 at the point 502. Each time the optical disc 102 has been rotated a given amount, such as each time one of the alignment marks 202 is detected, the fine actuator 114C decreases the radial position of the optical mechanism 106. The optical mechanism 166 thus traces the discrete spiral path portion 506 of the discrete spiral path 302. At the point 504, however the fine actuator 114C has moved to the end of its range, and cannot decrease the radial position of the optical mechanism 106 any further. That is, the fine actuator 114C cannot be adjusted any further. The discrete spiral path portion 506 thus extends from point 502 to the point 504. Alternatively, the point 504 may be the point at which the fine actuator 114C is not desired to be moved any further, such as to prevent overheating of the fine actuator 114C, even where the fine actuator 114C can be moved further.

Referring next to FIG. 5B, the coarse actuator 114B moves the optical mechanism 106 radially outward. When the coarse actuator 114B is moved radially outward, the fine actuator 114C is moved radially to a maximum inward or outward position, so that it has a maximum range of motion relative to the new radial position that is moved to resulting from the coarse actuator 114B having been moved. As the coarse actuator 114B moves the optical mechanism 106 radially outward, however, the optical disc 102 continues to rotate. Therefore, ultimately the optical mechanism 106 begins tracing another discrete spiral path portion 508 of the discrete spiral path 302 at the point 510. As before, each time the optical disc 102 has been rotated a given amount, such as each time one of the alignment marks 202 is detected, the fine actuator 114C moves the optical mechanism 106 radially inward, so that the optical mechanism 106 traces the discrete spiral path portion 508. This process continues until the discrete spiral path portion 508 meets the previously traced discrete spiral path portion 506, at the point 502. The point 502 is therefore the ending point of the discrete spiral path portion 508, and the starting point of the discrete spiral path portion 506.

Referring next to FIG. 5C, the coarse actuator 114B again moves the optical mechanism 106 radially outward. Because the optical disc 102 continues to rotate during the radial outward movement of the optical mechanism 106, the optical mechanism 106 begins tracing another discrete spiral path portion 514 of the discrete spiral path 302 at the point 512. Also as before, each time the optical disc 102 has been rotated a given amount, the fine actuator 114C moves the optical mechanism 106 radially inward, so that the optical mechanism 106 traces the discrete spiral path portion 514. This process continues until the discrete spiral path portion 514 meets the previously traced discrete spiral path portion 508, at the point 510. The point 510 is therefore the ending point of the discrete spiral path portion 514, and the starting point of the discrete spiral path portion 508.

The process described in relation to FIGS. 5A-5C is one in which the coarse actuator 114B moves the optical mechanism 106 radially outward, and the fine actuator 114B moves the optical mechanism 106 radially inward, for the optical mechanism 106 to trace the discrete spiral path 302 Alternatively, the coarse actuator 114B may move the optical mechanism 106 radially inward, and the fine actuator 114B may move the optical mechanism 106 radially outward, for the optical mechanism 106 to trace the discrete spiral path 302. Alternatively still, both the coarse actuator 114B and the fine actuator 114B may move the optical mechanism 106 in the same direction, either radially inward or radially outward, for the optical mechanism 106 to trace the discrete spiral path 302.

Constant Linear Velocity

As the optical mechanism 106 of the optical drive 100 of FIG. 1 traces the discrete spiral path 302 in relation to the optical disc 102, it selectively optically writes to pixels on the label side 104A of the optical disc 102 to produce a desired image on the label side 104A. A pixel is defined herein as a position on the label side 104A of the optical disc 102 at which the optical mechanism 106 can write, or not write, a mark, depending on the dictates of the desired image to be written to the label side 104A of the optical disc 102. Stated another way, a desired image can be mapped to or over the pixels of the label side 104A of the optical disc 102, such that some pixels have marks optically written thereto, and some pixels do not have marks optically written thereto, so that the end result is the image being optically written to the label side 104A of the optical disc 102. That the optical mechanism 106 selectively writes to the pixels on the label side 104A of the optical disc 102 means that for any given pixel, it may or may not optically write a mark thereto, such that a desired image is ultimately optically written to the label side 104A of the optical disc 102.

Figure 6:
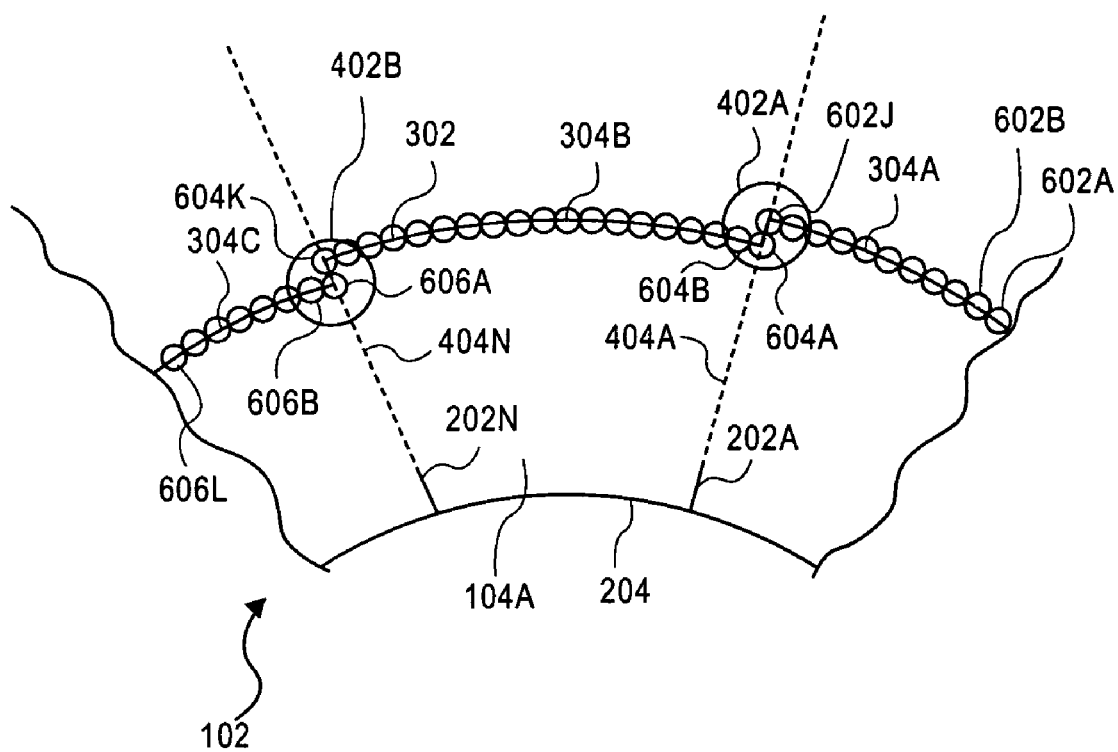
FIG. 6 is a diagram of a portion of the discrete spiral path of FIG. 3 in detail, depicting pixels to which an optical mechanism can write that are equally sized and equidistantly spaced due to maintaining a constant linear velocity of the optical mechanism throughout the path portion, according to an embodiment of the invention.

FIG. 6 shows in detail a portion of the discrete spiral path 302, to depict pixels 602, 604, and 606 to which the optical mechanism 106 can optically write marks, and how the pixels 602, 604, and 606 can be equally sized and equidistantly spaced, according to an embodiment of the invention. The portion of the discrete spiral path 302 is representative of the entire discrete spiral path 302 insofar as to ensuring that the pixels or positions to which the optical mechanism 106 can optically write marks are equally sized and equidistantly spaced is concerned. The concentrically circular segment 304A of the discrete spiral path 302 includes pixels, or positions, 602A, 602B, . . . , 602J, collectively referred to as the pixels, or positions, 602. The concentrically circular segment 304B of the discrete spiral path 302 includes pixels, or positions, 604A, 604B, . . . , 604K, collectively referred to as the pixels, or positions, 604. The concentrically circular segment 304C of the discrete spiral path includes pixels, or positions, 606A, 606B, . . . , 606L, collectively referred to as the pixels, or positions, 606. The pixels, or positions, 602, 604, and 606 on the label side 104A of the optical disc 102 to which the optical mechanism 106 can optically write marks are thus on the discrete spiral path 302 that the optical mechanism 106 travels in relation to the optical disc 102.

Before proceeding, the difference between angular velocity and linear velocity is described. The angular velocity is the angular rate at which the optical disc 102 is rotated. All the positions on the optical disc 102 rotate at the same angular velocity. By comparison, the linear velocity at a position on the optical disc 102, which is more particularly the tangential linear velocity at the position, is equal to the radius of this position, relative to the center of the optical disc 102, multiplied by the angular velocity at which the optical disc 102 is rotated. Thus, positions on the optical disc 102 that are further outward from the center of the optical disc 102 have greater linear velocities than positions that are further inward towards the center of the optical disc 102, for any given angular velocity at which the optical disc 102 is rotating.

While the optical mechanism 106 is tracing the concentrically circular segment 304A of the discrete spiral path 302, it is at the same radial position relative to the optical disc 102. The optical mechanism 106 is able to trace the segment 304A because the optical disc 102 is rotating, as has been described. To ensure that the pixels 602 are equally sized and equidistantly spaced, the optical disc 102 has to rotate at the same angular velocity while the optical mechanism 106 is tracing over the concentrically circular segment 304A. Because the optical mechanism 106 is at the same radial position relative to the optical disc 102 during this time, rotation of the optical disc 102 at a constant angular velocity ensures that the optical mechanism 106 is tracing the segment 304A of the discrete spiral path 302 at a constant linear velocity. (It is noted that in actuality the linear velocity may not be perfectly constant, and may vary slightly, such that the terminology "at least substantially constant linear velocity" can be more accurately used to denote that the linear velocity is essentially constant, but may vary a little in actuality.)

When the optical mechanism 106 transitions to the concentrically circular segment 304B of the discrete spiral path 302, it is at a different radial position relative to the optical disc 102. Therefore, to ensure that the pixels 604 of the segment 304B are equally sized and equidistantly spaced relative to the pixels 602 of the segment 304A, the optical mechanism 106 needs to trace the segment 304B at the same linear velocity at which it traced the segment 304A. However, because the segment 304B is radially inward at the segment 304A, the optical disc 102 has to rotate at a faster angular velocity while the optical mechanism 106 is tracing the segment 304B as compared to the angular velocity at which the optical disc 102 rotated while the optical mechanism 106 was tracing the segment 304A, to maintain the same linear velocity.

Stated another way, if the angular velocity of the optical disc 102 remained the same for both the concentrically circular segments 304A and 304B of the discrete spiral path 302, then the pixels 604 of the segment 304B would be smaller in size and/or less spaced out (in other words, more pixels per unit distance along the segment) as compared to the pixels 602 of the segment 304A. This is because the linear velocity of the optical mechanism 106 while tracing the segment 304B would be lesser than while tracing the segment 304A if the angular velocity of the optical disc 102 remains the same. In other words, the lesser radial position of the optical mechanism 106 at the segment 304B compared to the segment 304A means that the optical mechanism 106 moves slower while at the segment 304B compared to while at the segment 304A for the same angular velocity of the optical disc 102.

The optical mechanism 106 may be capable of writing to pixels that are defined every time a given period of time has elapsed. If the angular velocity of the optical disc 102 were the same for both the concentrically circular segments 304A and 304B, then the optical mechanism 106 would travel less during this given period of time at the segment 304B. As a result, the pixels 604 of the segment 304B would be spaced out less than the pixels 602 of the segment 304A at the same angular velocity because the optical mechanism 106 travels less distance along the segment between pixels while tracing the segment 304B than while tracing the segment 304A. Furthermore, the pixels 604 of the segment 304B would be smaller than the pixels 602 of the segment 304A. This is because while the beam 108 of FIG. 1 is being generated by the optical mechanism 106, it would cover a smaller area of the segment 304B than of the segment 304A, since the linear velocity of the optical mechanism 106 would be smaller in the segment 304B than in the segment 304A.

To achieve pixels 604 that are equidistantly spaced and equally spaced as compared to the pixels 602, then, the optical mechanism 106 is to trace the concentrically circular segment 304B at the same linear velocity as it traces the concentrically circular segment 304A. Therefore, when the optical mechanism 106 is radially moved between the segments 304A and 304B, at the transition denoted by the circled area 402A, the angular velocity of the optical disc 102 is correspondingly changed. More specifically, when the optical mechanism 106 radially moves inward, an increase in the angular velocity of the optical disc 102 is effected so that the optical mechanism 106 maintains the same linear velocity. The angular velocity of the optical disc 102 is changed by the rotation mechanism 116A of the controller 116 of FIG. 1 causing the spindle motor 110B to slow or quicken its rotation of the spindle 110A of FIG. 1, and hence of the optical disc 102 situated on the spindle 110A.

The amount by which the angular velocity of the optical disc 102 is to be so changed to ensure the same linear velocity of the optical mechanism 106 can be expressed mathematically. The linear velocity of the optical mechanism 106, denoted as L millimeters per second (mm/sec), is functionally related to the angular velocity of the optical disc 102, denoted as A revolutions per minute (rpm) by the following equation:

$$L = \frac{2\pi r A}{60}. \tag{1}$$

In equation (1), r is the current radial position of the optical mechanism 106 relative to the optical disc 102 in millimeters (mm). For a change in radial position $\Delta r$, the angular velocity change $\Delta A$ to maintain a constant linear velocity L is as follows:

$$\Delta A = -\frac{A \Delta r}{(r + \Delta r)}. \tag{2}$$

Therefore, when the optical mechanism 106 has its radial position changed by a distance $\Delta r$ at the transition between the segments 304A and 304B indicated by the circled area 402A, the angular velocity of the optical disc 102 is changed by $\Delta A$. (The distance $\Delta r$ is positive for radially outward movement, which results in a decrease in the angular velocity $\Delta A$ due to the minus sign in the right-hand portion of equation (2), and a negative $\Delta r$ results in a positive $\Delta A$, such that angular velocity increases.) This change in the angular velocity of the optical disc 102 ensure the same linear velocity of the optical mechanism 106 at both the segments 304A and 304B, and thus that the pixels 602 and 604 are equidistantly spaced and equally sized relative to one another. Similarly, when the optical mechanism 106 has its radial position changed by a distance $\Delta r$ at the transition between the segments 304B and 304C indicated by the circled area 402B, the angular velocity of the optical disc 102 is changed by $\Delta A$. This change in the angular velocity of the optical disc 102 ensure the same linear velocity of the optical mechanism 106 at both the segments 304B and 304C, and thus that the pixels 604 and 606 are equidistantly spaced and equally sized relative to one another.

The embodiment of FIG. 6 presumes that the optical drive 100 is able to change the angular velocity at which the optical disc 102 rotates at any time and wherever the optical mechanism 106 is radially positioned relative to the optical disc 102, specifically at transitions between adjacent concentrically circular segments 304 of the discrete spiral path 302. However, some types of optical drives cannot change the angular velocity of the optical disc 102 at any time and wherever the optical mechanism 106 is radially positioned relative to the optical disc 102. For instance, some types of optical drives are just able to change the angular velocity of the optical disc 102 between predefined concentric rings, or tracks, between which the optical mechanism 106 travels when radially moving relative to the optical disc 102. As another example, some types of optical drives are just able to change the angular velocity of the optical disc 102 once per revolution of the optical disc 102. For such an optical drive, if transitions between adjacent concentrically circular segments 304 of the discrete spiral path 302 lie within the same revolution of the optical disc 102, then the optical drive would not be able to change the angular velocity of the optical disc 102 at the transitions.

Figure 7:
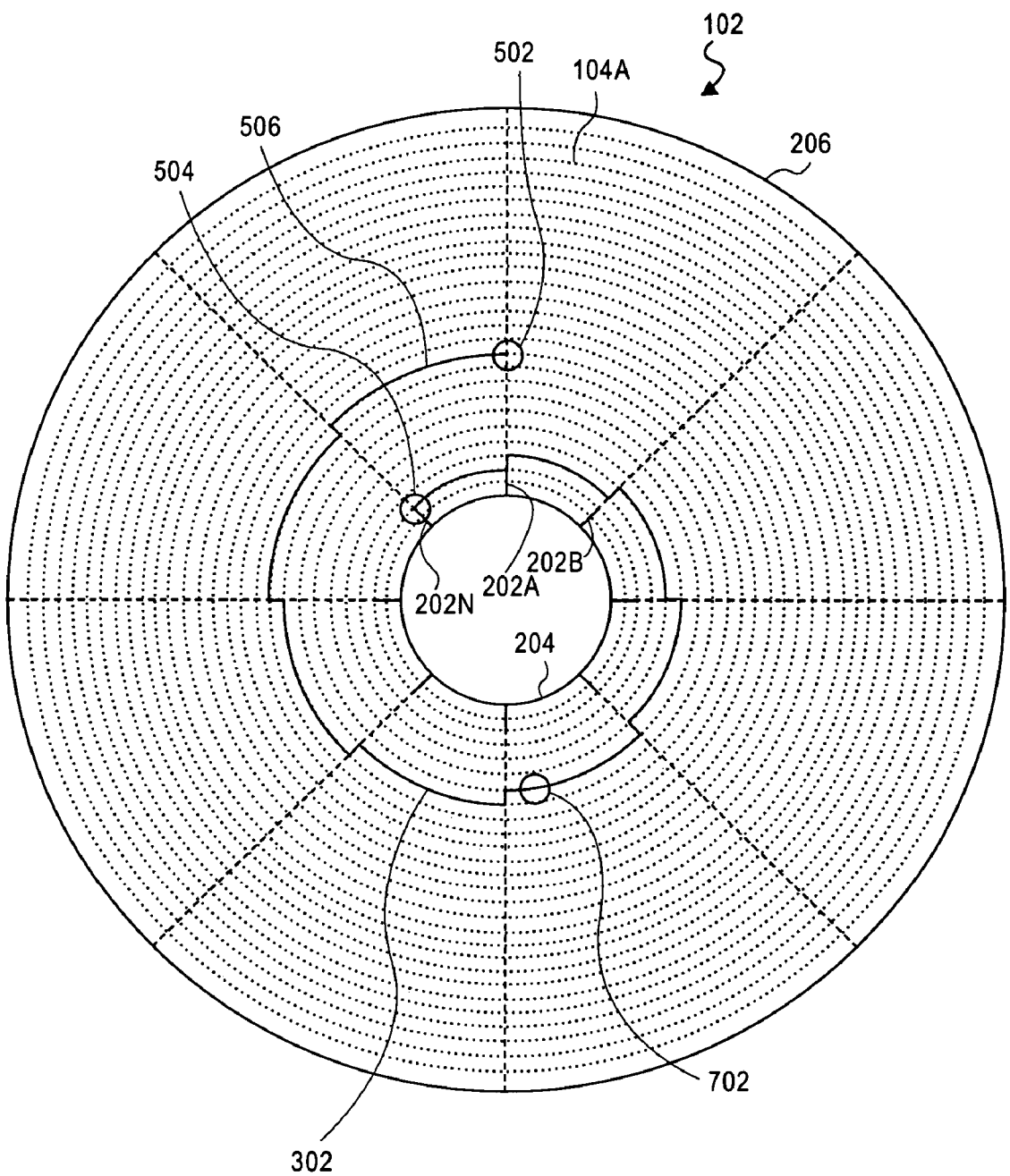
FIG. 7 is a diagram of the discrete spiral path of FIG. 3, depicting how the angular velocity at which the optical disc rotates can be set based on a radius halfway between the starting and ending radii of the path, where this angular velocity cannot be changed while an optical mechanism travels the path, according to an embodiment of the invention.

FIG. 7 shows in detail the portion 506 of the discrete spiral path 302, to depict how the angular velocity at which the optical disc 102 rotates can be set so that the pixels at which the optical mechanism 106 can optically write marks are on average equally sized and equidistantly spaced, according to an embodiment of the invention. The embodiment of the invention described in relation to FIG. 7 thus is intended for optical drives that cannot change the angular velocity of the optical disc 102 wherever the optical mechanism 106 is radially positioned relative to the optical disc 102. It is presumed that the discrete spiral path portion 506 lies completely within a concentric ring, or track, within which the optical drive is able to set a single constant angular velocity of the optical disc 102. That is, it is presumed that the optical drive is not able to vary the angular velocity of the optical disc 102 as the optical mechanism 106 moves along the discrete spiral path portion 506, such that the embodiment of FIG. 6 is not applicable to such an optical drive.

The optical drive first determines the starting radial point, or position, 502 of the discrete spiral path portion 506, and the ending radial point, or position, 504 of the discrete spiral path portion 506. Based on these two points 502 and 504, the, optical drive then determines a radial point, or position, 702 that is radially halfway between the points 502 and 504. (It is noted that the radial point 702 as specifically depicted in FIG. 7 is an exemplification of any radial point having this same radius.) The angular velocity of the optical disc 102 is set for the entire path portion 506 as if all the pixels along the path portion 506 have the same radius as the radial point 702. That is, the angular velocity of the optical disc 102 is set so that the pixels having the same radius as the radial point 702 are properly spaced and sized.

Because the radial point 702 is halfway between the starting point 502 and the ending point 504 insofar as its radius is concerned, on average the pixels, or positions, at which the optical mechanism 106 selectively writes are equidistantly spaced and equally spaced. The pixels having radii between the point 702 and the starting point 502 are farther apart and larger in size, but this is cancelled out by the pixels having radii between the point 702 and the ending point 504 being closer together and smaller in size. Although just the pixels having the same radius as the radial point 702 are properly spaced and sized, the pixels having radii that are larger than the radius at the radial point 702 result in spacing and sizing errors that cancel the spacing and sizing errors resulting from the pixels having radii that are smaller than the radius at the radial point 702. Each time a spiral path portion is reached by the optical mechanism 106 that is within a different concentric ring or track at which a single constant angular velocity of the optical disc 102 can be set, this process of setting the angular velocity based on the halfway radius between the starting and ending points of the portion is performed.

Setting the angular velocity at which the optical disc 102 rotates based on the halfway radius between the starting and ending points of a spiral path portion that is in a given concentric ring or track at which a single constant angular velocity of the optical disc 102 can be set is advantageous over the alternatives. For example, the angular velocity of the optical disc 102 could alternatively be set based on the radius of the starting point or the radius of the ending point of the spiral path portion. In either such instance, however, the maximum absolute error in pixel spacing and pixel sizing will be approximately double that which results from setting the angular velocity based on the radius of the halfway radial point. This is because there will be no error at either the starting point or the ending point, and then the error will increase to the ending point or the starting point, respectively, until a maximum error is reached.

By comparison, setting the angular velocity based on the radius of the halfway radial point means that at the starting point half the maximum error occurs, which then decreases until the halfway radial point is reached, and thereafter the error decreases in the opposite direction until half the maximum error again occurs at the ending point. That is, the pixels are too large and too far apart at the starting point, and then are too small and too close together at the ending point. However, if, for example, the angular velocity were instead set based on the radius of the starting point, the pixels at the ending point would be approximately doubly too small and approximately doubly too close together. Similarly, if the angular velocity were instead set based on the radius of the ending point, the pixels at the starting point would be approximately doubly too large and approximately doubly too far apart.

It is further noted that setting the angular velocity at which the optical disc 102 rotates based on the halfway radius between the radii of the starting and ending points 502 and 504, which is the radius of the radial point 702, results in a constant linear velocity of the optical mechanism 106 traveling the spiral path portion 506, on average. When the optical mechanism 106 is traveling between the starting point 502 and the first radial point having the radius of the radial point 702, its linear velocity is greater than its linear velocity when traveling at the radius of the radial point 702. However, when the optical mechanism 106 is traveling between the last radial point having the radius of the radial point 702 and the ending point 504, its linear velocity is lower than its linear velocity when traveling at the radius of the radial point 702. This faster then slower linear velocity effectively averages to a desired linear velocity. Thus, on average, the optical mechanism 106 has a constant linear velocity.

Method and Conclusion

Figure 8A:
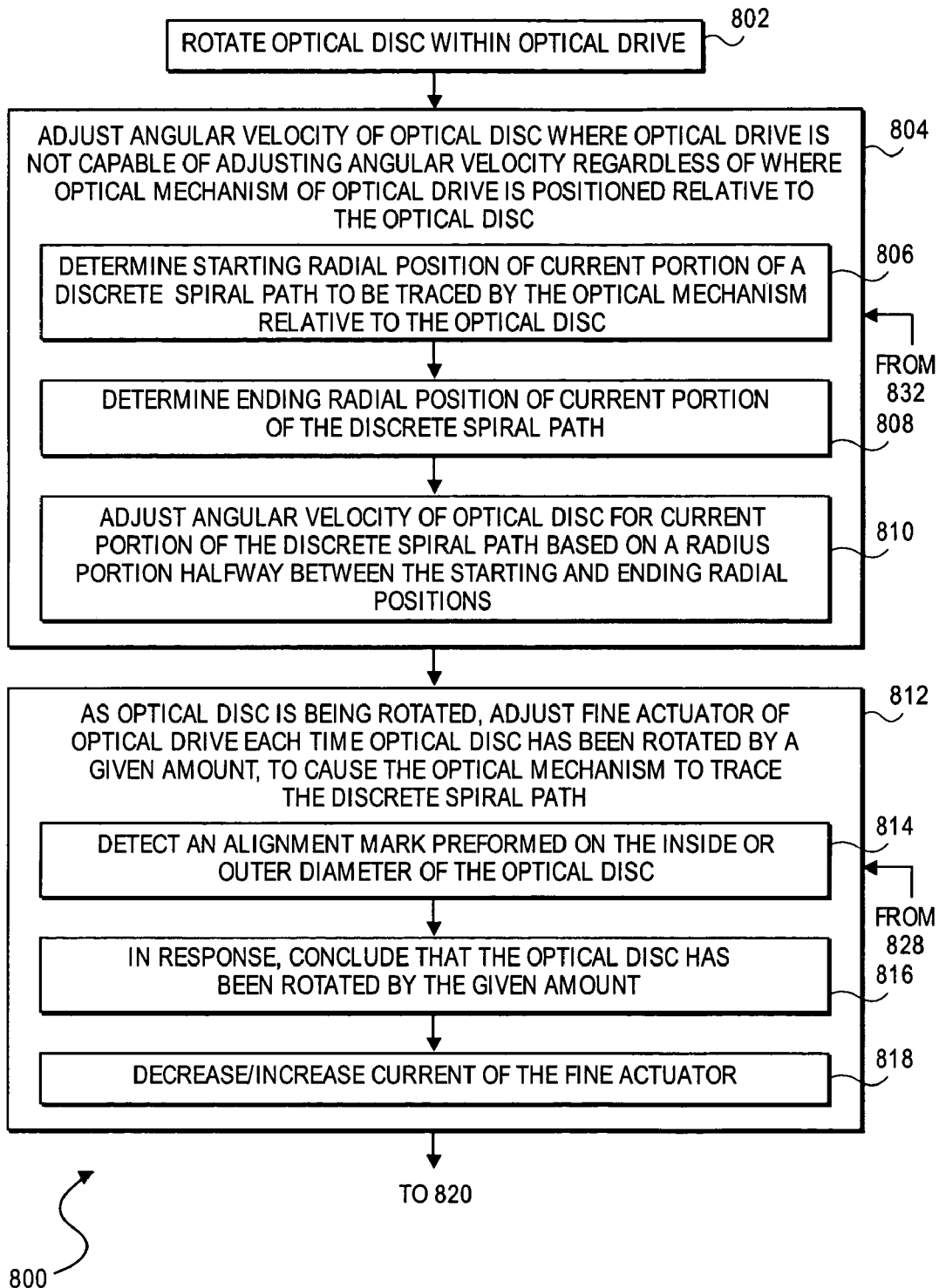
FIGS. 8A and 8B are flowcharts of a method for optically writing an image to the label side of an optical disc, according to an embodiment of the invention.
Figure 8B:
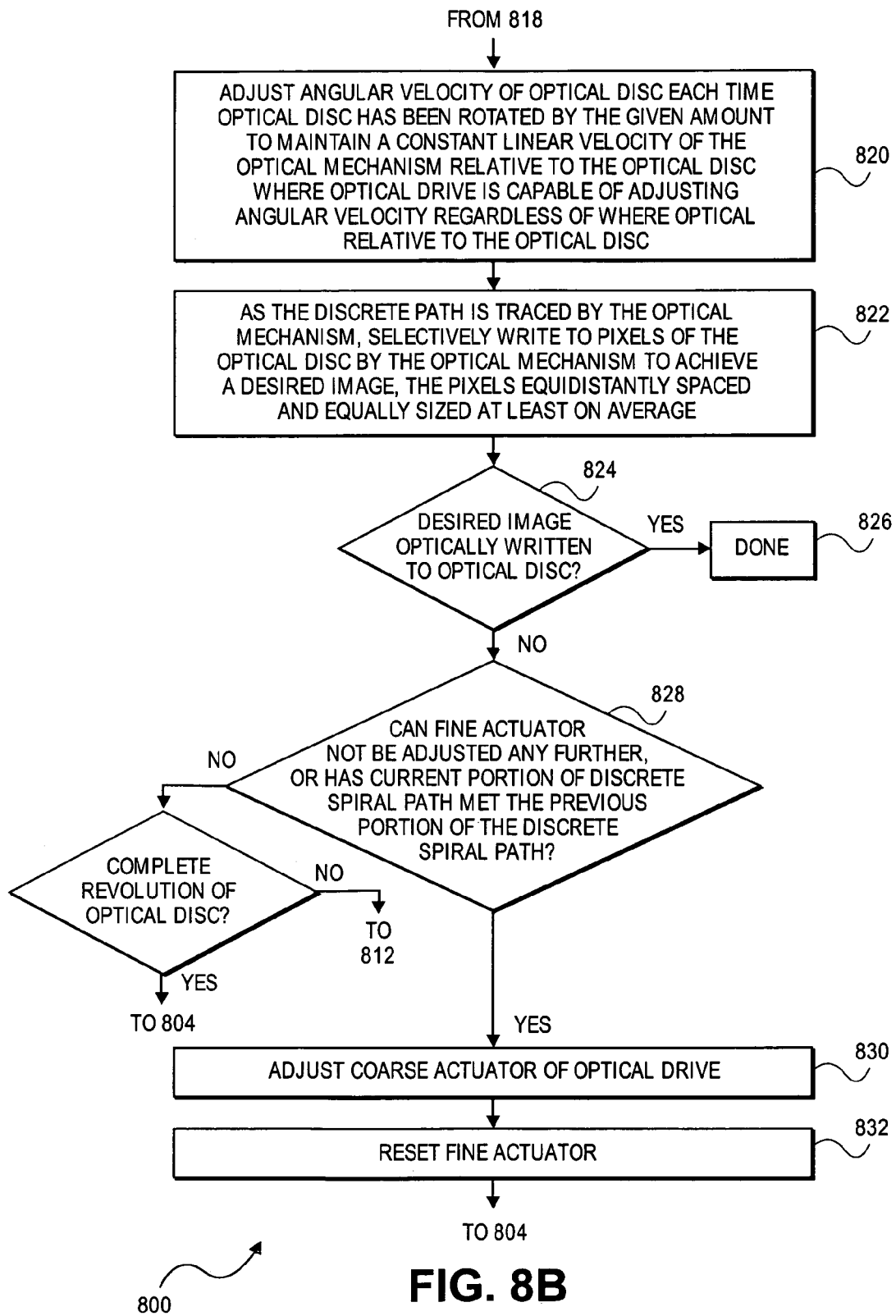

FIGS. 8A and 8B show a method 800 for optically writing an image to the optically writable label side 104A of the optical disc 102 with the optical drive 100 of FIG. 1, according to an embodiment of the invention. The method 800 may thus be performed by the components of the optical drive 100 that are shown in and have been described in relation to FIG. 1. At least some components of the method 800 may be implemented as computer program parts of a computer program stored on a computer-readable medium. The medium may be a magnetic storage medium, such as a hard disk drive, an optical storage medium, such as an optical disc, and/or a semiconductor storage medium, such as a memory, among other types of computer-readable media. The optical disc 102 is initially rotated within the optical drive 100 (802). Specifically, the rotation mechanism 116A of the controller 116 causes the spindle motor 110B to rotate the spindle 110A on which the optical disc 102 is situated.

If the optical drive 100 is not capable of adjusting the angular velocity at which the optical disc 102 rotates regardless of where the optical mechanism 106 is positioned relative to the optical disc 102, then the angular velocity of the optical disc 102 is next adjusted as follows (804). The starting radial position of a current portion of the discrete spiral path to be traced by the optical mechanism 106 relative to the optical disc 102 is determined (806), as is the ending radial position (808). The angular velocity is then adjusted for the current portion of the discrete spiral path based on the radius of a radial position that is radially halfway between the starting and ending radial positions (810). Thus, 804, 806, 808, and 810 implement the embodiment of the invention that has been described in relation to FIG. 7. 804, 806, 808, and 810 may be performed by the rotation mechanism 116A of the controller 116 of the optical drive 100 in one embodiment. Performing 804, 806, 808, and 810 causes the optical mechanism 106 to have a constant linear velocity, on average, relative to the optical disc 102, while traveling the current portion of the discrete spiral path.

As the optical disc 102 is being rotated, the fine actuator 114C of the optical drive 100 is adjusted each time the optical disc 102 has been rotated by a given amount, to cause the optical mechanism 106 to trace the discrete spiral path (812), as has been described in relation to FIGS. 3, 4, and 5A-5C. The fine actuator 114C may be adjusted by the fine actuator mechanism 116C of the controller 116 in this respect. In one embodiment, detection of one of the alignment marks 202 preformed on the inside circumference 204 or the outside circumference 206 of the label side 104A of the optical disc 102 (814) results in concluding that the optical disc 102 has been rotated by the given amount (816). Such detection may be accomplished by the detector 112 of the optical drive 100. Furthermore, in one embodiment, adjustment of the fine actuator 114C may be accomplished by increasing or decreasing the current of the fine actuator 114C (818), to cause the optical mechanism 106 to move radially to trace the discrete spiral path.

If the optical drive 100 is capable of adjusting the angular velocity of the optical disc 102 regardless of where the optical mechanism 106 is positioned relative to the optical disc 102, then the angular velocity is also adjusted each time the optical disc 102 has been rotated by the given amount (820). The angular velocity of the optical disc 102 can be adjusted by the rotation mechanism 116A of the controller 116 adjusting the spindle motor 110B. Performing 820 results in the optical mechanism 106 maintaining a constant linear velocity relative to the optical disc 102, as has been described in relation to FIG. 6. It is noted that either 804 is performed, or 820 is performed, depending on whether the optical drive 100 is capable of adjusting the angular velocity of the optical disc 102 regardless of where the optical mechanism 106 is positioned relative to the optical disc 102.

As the discrete path is traced by the optical mechanism 106, the optical mechanism 106 selectively writes to pixels on the label side 104A of the optical disc 102 to achieve a desired image (822). The pixels are equidistantly spaced and equally sized, at least on average. That is, if 820 is performed, then the pixels are absolutely equidistantly spaced and equally sized. However, if 804 is performed, then the pixels are equidistantly spaced and equally sized on average. Once the desired image has been completely optically written to the label side 104A of the optical disc 102 (824), then the method 800 is finished (826). However, where the desired image has not been completely optically written (824), if the fine actuator can still be adjusted, and the current portion of the discrete spiral path has not yet met the previous portion of the discrete spiral path (where such a previous portion has already been traced) (828), and a complete revolution of the optical disc 102 has not yet been made (829), then the method 800 is repeated beginning at 812. This situation is, for instance, that which has been described in relation to FIGS. 5A-5C.

However, if the fine actuator can still be adjusted, and the current portion of the discrete spiral path has not yet met the previous portion of the discrete spiral path (828), and a complete revolution of the optical disc 102 has been made (829), then the method 800 is repeated beginning at 804. It is noted that the inclusion of 829 is in accordance with one embodiment of the invention, where the angular velocity of the optical disc can only be adjusted once every revolution of the optical disc 102. In another embodiment of the invention, where, for instance, the angular velocity of the optical disc can be adjusted at any time, 829 is not performed. In such an embodiment, if the fine actuator can still be adjusted, and the current portion of the discrete spiral path has not yet met the previous portion of the discrete spiral path, then the method 800 proceeds from 828 directly to 812.

Once the fine actuator cannot be adjusted any further, or once the current portion of the discrete spiral path has met the previous portion of the discrete spiral path (828), then the coarse actuator 114B of the optical drive 100 is adjusted (830), to move the optical mechanism 106 to a new radial position relative to the optical disc 102. Where 804 is performed, as opposed to 820 being performed, this new radial position is in relation to a new portion of the optical disc 102 in which the optical drive 100 is able to adjust the angular velocity of the optical disc 102. The coarse actuator 114B can be adjusted by the coarse actuator mechanism 116B of the controller 116. The coarse actuator 114B controls the movement of the sled 114A on the rail 114D of the optical drive 100, to correspondingly control movement of the fine actuator 114C and the optical mechanism 106. The fine actuator 114C is further reset (832), so that it can again be adjusted within a given range of motion as previously described, and the method 800 is repeated at 804 thereof. Resetting the fine actuator 114C may include setting the current of the fine actuator 114C to an initial or default value, by the fine actuator mechanism 116C of the controller 116.

It is noted that there can be an alternative embodiment for performing 828 of the method 800 of FIGS. 8A-8B. In this alternative embodiment, which is not depicted in FIGS. 8A-8B, whether a complete revolution of the optical disc 102 has been completed is used as the basis for determining whether the method 800 proceeds after 828. If a complete revolution of the optical disc 102 has not been completed, and the fine actuator can still be adjusted, then the method 800 can be repeated beginning at 812 as before. As another example, however, if a complete revolution of the optical disc 102 has been made, such that a new revolution of the optical disc 102 is starting, and the fine actuator can still be adjusted, then the method 800 may be repeated beginning at 804, to change the angular velocity of the optical disc 102. That is, whereas in the embodiment of the method 800 depicted in FIGS. 8A-8B depicts two branches from 828—back to 812, or continuing to 830—in this alternative embodiment there are three branches from 828: back to 812, back to 804, and continuing to 830.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:
as an optical disc is being rotated within an optical drive, adjusting a fine actuator of the optical drive each time the optical disc has been rotated by a given amount, to cause an optical mechanism of the optical drive to trace a discrete spiral path relative to the optical disc; and,
as the discrete spiral path is traced by the optical mechanism of the optical drive, the optical mechanism selectively writing to the optical disc,
wherein for each complete rotation of the optical disc, the discrete spiral path comprises a plurality of segments, each segment having a radius that is different than the radius of each other segment.

2. The method of claim 1, wherein the optical mechanism selectively writes to the optical disc to form a human-readable image on the optical disc.

3. The method of claim 1, wherein adjusting the fine actuator of the optical drive each time the optical disc has been rotated by the given amount comprises:

detecting one of a plurality of alignment marks preformed at equidistant intervals around an inside circumference or an outside circumference of the optical disc; and, in response, concluding that the optical disc has been rotated by the given amount, such that the fine actuator of the optical drive is adjusted.

4. The method of claim 1, wherein adjusting the fine actuator of the optical drive comprises one of:

changing a current of the fine actuator, so that the discrete spiral path is traced towards an inside circumference of the optical disc; or, changing the current of the fine actuator, so that the discrete spiral path is traced towards an outside circumference of the optical disc.

5. The method of claim 1, further comprising:

adjusting a coarse actuator of the optical drive to radially move the optical mechanism of the optical drive to a new radial position relative to the optical disc;

resetting the fine actuator; and, repeating adjusting the fine actuator each time the optical disc has been rotated by the given amount, and as the discrete spiral path is traced by the optical mechanism, the optical mechanism selectively writing to the optical disc.

6. The method of claim 5, wherein the coarse actuator of the optical drive is adjusted when the fine actuator of the optical drive cannot be adjusted any further.

7. The method of claim 5, wherein adjusting the coarse actuator of the optical drive causes the optical mechanism of the optical drive to radially move in an opposite direction in which adjusting the fine actuator of the optical drive causes the optical mechanism to radially move.

8. The method of claim 7, wherein the coarse actuator of the optical drive is adjusted when the optical mechanism of the optical drive has moved, due to adjustment of the fine actuator of the optical drive, such that a current portion of the discrete spiral path traced by the optical mechanism relative to the optical disc meets a previous portion of the discrete spiral path traced by the optical mechanism relative to the optical disc.

9. The method of claim 7, wherein adjusting the fine actuator of the optical drive causes the optical mechanism of the optical drive to move in a first radial direction relative to a hub of the optical disc, and adjusting the coarse actuator of the optical drive causes the optical mechanism to radially move in a second radial direction opposite the first radial direction.

10. The method of claim 1, further comprising adjusting an angular velocity of the optical disc each time the optical disc has been rotated by the given amount, so as to maintain a constant linear velocity of the optical mechanism of the optical drive relative to the optical disc, and so that the optical mechanism selectively writes to equidistantly spaced and equally sized pixels of the optical disc.

11. The method of claim 1, further comprising:

determining a starting radial position of a current portion of the discrete spiral path;

determining an ending radial position of the current portion of the discrete spiral path; and, adjusting an angular velocity of the optical disc for the current portion of the discrete spiral path to maintain on average a constant linear velocity of the optical disc based on a radial position of the current portion of the discrete spiral path radially halfway between the starting radial position and the ending radial position, such that the optical mechanism selectively writes to on average equidistantly spaced and equally sized pixels of the optical disc.

12. A method for writing an image on an optical disc, comprising:

as the optical disc is being rotated within an optical drive, adjusting an angular velocity of the optical disc each time the optical disc has been rotated by a given amount, to maintain an at least substantially constant linear velocity of an optical mechanism of the optical drive relative to the optical disc;

comprising adjusting a fine actuator of the optical drive each time the optical disc has been rotated by the given amount, to cause a discrete spiral path relative to the optical disc to be traced by the optical mechanism of the optical drive; and, as the optical disc is being rotated within the optical drive, the optical mechanism selectively writing to equidistantly spaced and equally sized pixels of the optical disc, wherein for at least one complete rotation of the optical disc, the discrete spiral path comprises a plurality of segments, each segment having a radius that is different than the radius of each other segment.

13. The method of claim 12, wherein adjusting the angular velocity of the optical disc each time the optical disc has been rotated by the given amount comprises:

detecting one of a plurality of alignment marks preformed at equidistant intervals around an inside circumference or an outside circumference of the optical disc; and, in response, concluding that the optical disc has been rotated by the given amount, such that the angular velocity of the optical disc is adjusted.

14. The method of claim 12, the method further comprising:

adjusting a coarse actuator of the optical drive to radially move the optical mechanism of the optical drive to a new radial position relative to the optical disc;

resetting the fine actuator; and, repeating adjusting the angular velocity of the optical disc and the fine actuator of the optical drive each time the optical disc has been rotated by the given amount, and as the optical disc is being rotated within the optical drive, the optical mechanism selectively writing to equidistantly spaced and equally sized pixels of the optical disc.

15. The method of claim 14, wherein the coarse actuator of the optical drive is adjusted when the optical mechanism of the optical drive has moved, due to adjustment of the fine actuator of the optical drive, such that a current portion of the discrete spiral path traced by the optical mechanism relative to the optical disc meets a previous portion of the discrete spiral path traced by the optical mechanism relative to the optical disc.

16. A method for writing an image on an optical disc, comprising:

as an optical disc is being rotated within an optical drive, determining a starting radial position of a current portion of a discrete spiral path relative to the optical disc by an optical mechanism of the optical drive;

determining an ending radial position of the current portion of the discrete spiral path;

adjusting an angular velocity of the optical disc for the current portion of the discrete spiral path to maintain on average an at least substantially constant linear velocity of the optical disc based on a radial position of the current portion of the discrete spiral path halfway between the starting radial position and the ending radial position; and, the optical mechanism selectively writing to on average equidistantly spaced and equally sized pixels of the optical disc, wherein for at least one complete rotation of the optical disc, the discrete spiral path comprises a plurality of segments, each segment having a radius that is different than the radius of each other segment.

17. The method of claim 16, the method further comprising adjusting a fine actuator of the optical drive each time the optical disc has been rotated by a given amount, to cause the discrete spiral path relative to the optical disc to be traced by the optical mechanism of the optical drive.

18. The method of claim 17, wherein adjusting the fine actuator of the optical drive each time the optical disc has been rotated by the given amount comprises:
  detecting one of a plurality of alignment marks preformed at equidistant intervals around an inside circumference or an outside circumference of the optical disc; and,
  in response, concluding that the optical disc has been rotated by the given amount, such that the fine actuator of the optical drive is adjusted.

19. The method of claim 17, the method further comprising:
  adjusting a coarse actuator of the optical drive to radially move the optical mechanism of the optical drive to a new radial position relative to the optical disc and to advance the current portion of the discrete spiral path to a new portion of the discrete spiral path;
  resetting the fine actuator; and,
  repeating determining the starting position and the ending position of the current portion of the discrete spiral path, adjusting the angular velocity of the optical disc for the current portion of the discrete spiral path, adjusting the fine actuator of the optical drive each time the optical disc has been rotated by the given amount, and as the optical disc is being rotated within the optical drive, the optical mechanism selectively writing to on average equidistantly spaced and equally sized pixels of the optical disc.

20. The method of claim 19, wherein the coarse actuator of the optical drive is adjusted when the optical mechanism of the optical drive has moved, due to adjustment of the fine actuator of the optical drive, such that a current portion of the discrete spiral path traced by the optical mechanism relative to the optical disc meets a previous portion of the discrete spiral path traced by the optical mechanism relative to the optical disc.

21. An optical drive comprising:
  a motor to rotate an optical disc at an angular velocity;
  a detector to detect alignment marks preformed at equidistant intervals around an inside circumference or an outside circumference of the optical disc;
  an optical mechanism to write to the optical disc, the optical mechanism being movably positionable relative to the optical disc in a radial manner and in relation to which the optical disc has a linear velocity; and,
  a fine actuator for the optical mechanism to be adjusted each time one of the alignment marks has been detected to cause the optical mechanism to trace a discrete spiral path relative to the optical disc;
  a first mechanism to adjust the angular velocity of the optical disc each time one of the alignment marks has been detected to maintain an at least substantially constant linear velocity of the optical mechanism relative to the optical disc, such that the optical mechanism is to selectively write to equidistantly spaced and equally sized pixels of the optical disc; or,
  a second mechanism to adjust the angular velocity of the optical disc to maintain on average an at least substantially constant linear velocity of the optical mechanism relative to the optical disc, such that the optical mechanism is to selectively write to on average equidistantly spaced and equally sized pixels of the optical disc,
  wherein for at least one complete rotation of the optical disc, the discrete spiral path comprises a plurality of segments, each segment having a radius that is different than the radius of each other segment.

22. The optical drive of claim 21, wherein the discrete spiral path is traced in an open-loop manner, such that no verification or feedback of the discrete spiral path traced by the optical mechanism occurs.

23. The optical drive of claim 21, further comprising a coarse actuator for the optical mechanism to be adjusted when the fine actuator cannot be adjusted any further.

24. The optical drive of claim 21, further comprising a coarse actuator for the optical mechanism to be adjusted when the optical mechanism has moved, due to adjustment of the fine actuator, such that a current portion of the discrete spiral path traced by the optical mechanism relative to the optical disc meets a previous portion of the discrete spiral path traced by the optical mechanism.

25. The optical drive of claim 21, wherein the second mechanism is to adjust the angular velocity of the optical disc to maintain on average the constant linear velocity of the optical mechanism relative to the optical disc by determining starting and ending radial positions of a current portion of the discrete spiral path, and by adjusting the angular velocity of the optical disc for the current portion of the discrete spiral path based on a radial position of the current portion of the discrete spiral radially halfway between the starting and the ending radial positions.

26. A computer-readable medium having a computer program stored thereon comprising:
  a first computer program part to, as an optical disc is being rotated within an optical drive, adjust a fine actuator of the optical drive each time the optical disc has been rotated by a given amount, to cause an optical mechanism of the optical drive to trace a discrete spiral path relative to the optical disc;
  a second computer program part to, as the optical disc is being rotated, adjust an angular velocity of the optical disc each time the optical disc has been rotated by the given amount, to maintain an at least substantially constant linear velocity of the optical mechanism of the optical drive relative to the optical disc; and,
  a third computer program part to, as the optical disc is being rotated, selectively write to equidistantly spaced and equally sized pixels of the optical disc,
  wherein for each complete rotation of the optical disc, the discrete spiral path comprises a plurality of segments, each segment having a radius that is different than the radius of each other segment.

27. A computer-readable medium having a computer program stored thereon comprising:
  a first computer program part to, as an optical disc is being rotated within an optical drive, adjust a fine actuator of the optical drive each time the optical disc has been rotated by a given amount, to cause an optical mechanism of the optical drive to trace a discrete spiral path relative to the optical disc;
  a second computer program part to, as the optical disc is being rotated, adjust an angular velocity of the optical disc, to maintain on average an at least substantially constant linear velocity of the optical mechanism of the optical drive relative to the optical disc; and, a third computer program part to, as the optical disc is being rotated, selectively write to on average equidistantly spaced and equally sized pixels of the optical disc, wherein for each complete rotation of the optical disc, the discrete spiral path comprises a plurality of segments, each segment having a radius that is different than the radius of each other segment.

* * * * *